(12) United States Patent
Saito

(10) Patent No.: US 9,985,445 B2
(45) Date of Patent: May 29, 2018

(54) CHARGING/DISCHARGING CONTROL CIRCUIT, CHARGING/DISCHARGING CONTROL DEVICE, AND BATTERY APPARATUS

(71) Applicant: SII Semiconductor Corporation, Chiba-shi, Chiba (JP)

(72) Inventor: Hiroshi Saito, Chiba (JP)

(73) Assignee: ABLIC INC., Chiba (JP)

( * ) Notice: Subject to any disclaimer, the term of this patent is extended or adjusted under 35 U.S.C. 154(b) by 120 days.

(21) Appl. No.: 15/190,459

(22) Filed: Jun. 23, 2016

(65) Prior Publication Data
US 2017/0005490 A1 Jan. 5, 2017

(30) Foreign Application Priority Data
Jun. 30, 2015 (JP) .................. 2015-131485

(51) Int. Cl.
*H01M 10/46* (2006.01)
*H02J 7/00* (2006.01)

(52) U.S. Cl.
CPC .......... *H02J 7/0026* (2013.01); *H02J 7/0031* (2013.01); *H02J 7/0072* (2013.01); *H02J 2007/004* (2013.01); *H02J 2007/0037* (2013.01)

(58) Field of Classification Search
CPC ............ H02J 7/0021; H02J 7/0026; H02J 2007/0037; H02J 2007/004
USPC .......................... 320/116, 134, 136
See application file for complete search history.

(56) References Cited

U.S. PATENT DOCUMENTS

| | | | |
|---|---|---|---|
| 8,030,897 B2* | 10/2011 | Anupindi | H01M 10/425 320/128 |
| 8,541,981 B2* | 9/2013 | Zhang | H02J 7/0026 320/134 |
| 2005/0182987 A1 | 8/2005 | Sakurai | |
| 2008/0157719 A1* | 7/2008 | Koike | H02J 7/0031 320/134 |

* cited by examiner

*Primary Examiner* — Edward Tso
(74) *Attorney, Agent, or Firm* — Brinks Gilson & Lione

(57) ABSTRACT

To suppress an increase in the number of components in a charging/discharging control device and a battery apparatus which perform charging/discharging of a plurality of secondary batteries connected in series. A first charging/discharging control circuit receives an overdischarge signal generated based on the turning OFF of a discharging control switch therein and generates a power-down signal, based on the overdischarge signal to power-down a first battery voltage monitoring circuit. A second charging/discharging control circuit receives the power-down signal therein and power-down a second battery voltage monitoring circuit, based on the power-down signal.

7 Claims, 3 Drawing Sheets

US 9,985,445 B2

CHARGING/DISCHARGING CONTROL CIRCUIT, CHARGING/DISCHARGING CONTROL DEVICE, AND BATTERY APPARATUS

RELATED APPLICATIONS

This application claims priority under 35 U.S.C. § 119 to Japanese Patent Application No. 2015-131485 filed on Jun. 30, 2015, the entire content of which is hereby incorporated by reference.

BACKGROUND OF THE INVENTION

Field of the Invention

The present invention relates to a charging/discharging control circuit and a charging/discharging control device capable of controlling charging/discharging of a secondary battery, and a battery apparatus equipped with the charging/discharging control device.

Background Art

As a related art battery apparatus equipped with a charging/discharging control device, there has been proposed one equipped with a power-down circuit which suppresses a further voltage drop of a secondary battery where the secondary battery becomes an overdischarging state in which the voltage of the secondary battery is lower than a prescribed voltage (refer to, for example, Patent Document 1). According to such a power-down circuit, it is possible to reduce current consumption of the charging/discharging control device itself.

In such a related art battery apparatus, when secondary batteries equivalent to the number exceeding the breakdown voltage of the charging/discharging control device are connected in series, it follows that a plurality of charging/discharging control devices are arranged.

FIG. 3 illustrates a circuit diagram of a battery apparatus 300 according to a related art, which is equipped with a plurality of secondary batteries.

The related art battery apparatus 300 is equipped with external terminals 401 and 402 between which a charger or a load is connected, two secondary batteries 403-1 and 403-2 connected in series between the external terminals 401 and 402, a discharging control switch 404, a charging control switch 405, and charging/discharging control circuits 301-1 and 301-2 respectively connected to the secondary batteries 403-1 and 403-2.

The charging/discharging control circuit 301-1 is configured so as to be equipped with a battery voltage monitoring circuit 30-1, an output control circuit 31-1, and a power-down circuit 33-1. Likewise, the charging/discharging control circuit 301-2 is configured so as to be equipped with a battery voltage monitoring circuit 30-2, an output control circuit 31-2, and a power-down circuit 33-2.

The charging/discharging control circuit 301-1 is operated as follows:

The battery voltage monitoring circuit 30-1 monitors the voltage of the secondary battery 403-1 and outputs a detection signal indicating that the secondary battery 403-1 is in an overdischarging state or an overcharging state to the output control circuit 31-1. When the detection signal indicating that the secondary battery 403-1 is overdischarged is outputted, the output control circuit 31-1 turns OFF the discharging control switch 404. When the detection signal indicating that the secondary battery 403-1 is overcharged is outputted, the output control circuit 31-1 turns OFF the charging control switch 405. The power-down circuit 33-1 outputs a power-down signal to the battery voltage monitoring circuit 30-1 in response to an overdischarge signal ODC-1 generated on the basis of the fact that the secondary battery 403-1 is overdischarged and the discharging control switch 404 is turned OFF. Further, when the battery voltage monitoring circuit 30-1 receives the power-down signal outputted from the power-down circuit 33-1, the battery voltage monitoring circuit 30-1 stops its own operation. Thus, current consumption of the charging/discharging control circuit 301-1 is reduced.

Since the operation of the charging/discharging control circuit 301-2 is similar to that of the charging/discharging control circuit 301-1, its description will be omitted.

A description will next be made about the generation of the overdischarge signals ODC-1 and ODC-2 for generating the power-down signals in the power-down circuits 33-1 and 33-2 respectively.

The battery apparatus 300 is further equipped with Nch transistors 310, 311, 316, and 317, Pch transistors 312, 315, 318, and 320, resistors 314, 319, 321, and 322, and a Zener diode 313, which are connected between the external terminals 401 and 402.

When the secondary battery 403-1 is overdischarged and the discharging control switch 404 is turned OFF, the voltage of the external terminal 402 is operated so as to be equal to that of the external terminal 401 by a load (not illustrated) connected between the external terminals 401 and 402. That is, when the voltage of the external terminal 402 rises. When the voltage of the external terminal 402 rises, the Nch transistor 311 and the Pch transistor 315 are turned ON, the Nch transistor 316 is turned OFF, and the Pch transistors 310 and 312 are turned OFF. Thus, the overdischarge signal ODC-1 is pulled up to the positive power supply voltage of the secondary battery 403-1. Further, since the Nch transistor 317 is turned OFF, the Pch transistor 318 is turned ON, and the Pch transistor 320 is turned OFF, the overdischarge signal ODC-2 is pulled up to the positive power supply voltage of the secondary battery 403-2.

Further, since each transistor is operated in the same way as when the secondary battery 403-1 is overdischarged, even when the secondary battery 403-2 is overdischarged, the overdischarge signal ODC-1 is pulled up to the positive power supply voltage of the secondary battery 403-1, and the overdischarge signal ODC-2 is pulled up to the positive power supply voltage of the secondary battery 403-2, respectively.

In the related art battery apparatus as described above, even if any of the plural secondary batteries is overdischarged where the plural secondary batteries are connected in series, the respective power-down circuits of the plural charging/discharging control circuits are operated to make it possible to reduce current consumption.

[Patent Document 1] Japanese Patent Application Laid-Open No. 2005-229774

SUMMARY OF THE INVENTION

In the related art battery apparatus 300 illustrated in FIG. 3, however, since the plural elements such as the transistors are used to generate the overdischarge signals ODC-1 and ODC-2 for operating the power-down circuits 33-1 and 33-2 of the charging/discharging control circuits 301-1 and 301-2, a large number of components are required. Also, the number of the components will further increase as the number of the secondary batteries increases. Further, a problem arises in that expensive transistors high in breakdown voltage are used in consideration of the breakdown voltage which changes due to the number of secondary batteries to be connected, and a circuit configuration or the like corresponding to the breakdown voltage is required, so that the cost for configuring the battery apparatus becomes high and circuits therefor become complex.

Accordingly, an object of the present invention is to reduce the number of components and realize a reduction in current consumption by an inexpensive and simple circuit configuration in a charging/discharging control device and a battery apparatus which perform charging/discharging of a plurality of secondary batteries connected in series.

In order to solve the above-described problems, there is provided a charging/discharging control circuit according to the present invention, which includes a battery voltage monitoring circuit which monitors a voltage of a secondary battery and outputs a detection signal indicative of the second battery being overdischarged or overcharged, an output control circuit which receives the detection signal therein and which outputs a discharge control signal for turning OFF a discharging control switch in response to the detection signal being indicative of the overdischarging, and outputs a charge control signal for turning OFF a charging control switch in response to the detection signal being indicative of the overcharging, a pull-up circuit which receives a first power-down signal from an input terminal and outputs a pull-up signal obtained by pulling up the first power-down signal to a positive power supply voltage of the secondary battery, and a power-down circuit which outputs a second power-down signal, based on the pull-up signal.

Further, there is provided a charging/discharging control device according to the present invention, which controls first and second secondary batteries, a discharging control switch, and a charging control switch connected in series between first and second external terminals, and includes first and second charging/discharging control circuits respectively provided corresponding to the first and second secondary batteries. The first charging/discharging control circuit includes a first battery voltage monitoring circuit which monitors a voltage of the first secondary battery and outputs a first detection signal indicative of the first secondary battery being overdischarged or overcharged, a first output control circuit which receives the first detection signal therein and which outputs a first discharge control signal for turning OFF the discharging control switch in response to the first detection signal being indicative of the overdischarging, and outputs a first charge control signal for turning OFF the charging control switch in response to the first detection signal being indicative of the overcharging, a first pull-up circuit which in response to an overdischarge signal or an external power-down signal generated based on the first discharge control signal, outputs a first pull-up signal obtained by pulling up the overdischarge signal or the external power-down signal to a positive power supply voltage of the first charging/discharging control circuit, and a first power-down circuit which outputs a first power-down signal for stopping the first battery voltage monitoring circuit, based on the first pull-up signal. The second charging/discharging control circuit includes a second battery voltage monitoring circuit which monitors a voltage of the second secondary battery and outputs a second detection signal indicative of the second secondary battery being overdischarged or overcharged, a second output control circuit which receives the second detection signal therein and which outputs a second discharge control signal for turning OFF the discharging control switch in response to the second detection signal being indicative of the overdischarging, and outputs a second charge control signal for turning OFF the charging control switch in response to the second detection signal being indicative of the overcharging, a second pull-up circuit which in response to the first power-down signal, outputs a second pull-up signal obtained by pulling up the first power-down signal to a positive power supply voltage of the second charging/discharging control circuit, and a second power-down circuit which outputs a second power-down signal for stopping the second battery voltage monitoring circuit, based on the second pull-up signal.

Furthermore, there is provided a battery apparatus according to the present invention, which includes first and second external terminals, first and second secondary batteries, a discharging control switch, and a charging control switch connected in series between the first and second external terminals, and the charging/discharging control device. The first and second secondary batteries, the discharging control switch, and the charging control switch are controlled by the charging/discharging control device.

According to the present invention, in the first charging/discharging control device, the first power-down signal is generated based on the overdischarge signal generated based on the first discharge control signal, whereas in the second charging/discharging control device, the second power-down signal is generated based on the first power-down signal generated in the first charging/discharging control device. That is, it is not necessary to generate an overdischarge signal for the generation of the second power-down signal. Thus, it is sufficient that elements such as transistors or the like equivalent to the number required to generate only the overdischarge signal for generating the first power-down signal exist. It is possible to prevent an increase in the number of components.

It is thus possible to provide a charging/discharging control device capable of suppressing costs without complicating circuits therefor even if the number of secondary batteries to be connected increases, and a battery apparatus equipped with the charging/discharging control device.

DETAILED DESCRIPTION OF THE PREFERRED EMBODIMENTS

A preferred embodiment of the present invention will hereinafter be described with reference to the accompanying drawings.

Figure 1:
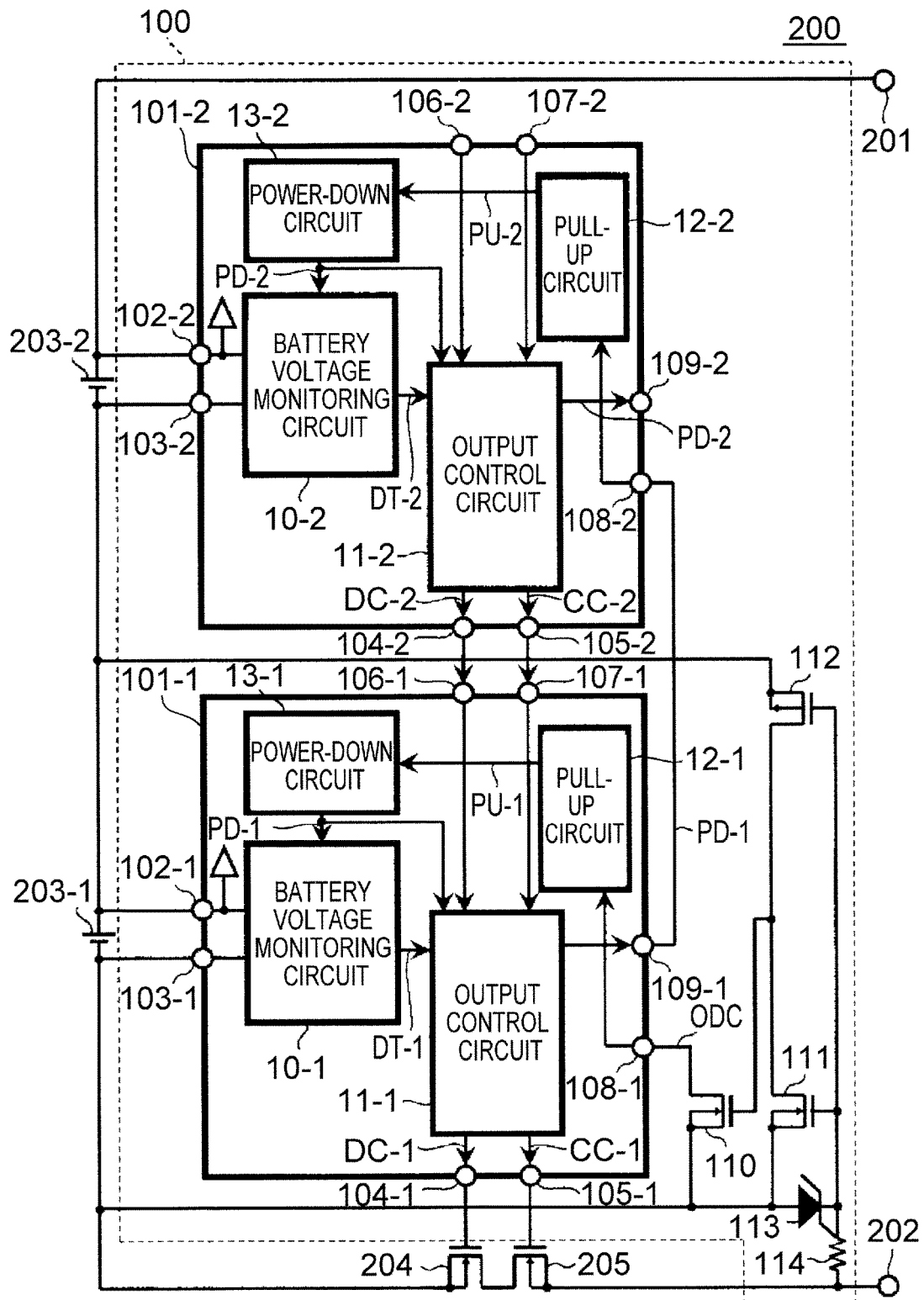
FIG. 1 is a circuit diagram illustrating a battery apparatus equipped with a charging/discharging control device according to an embodiment of the present invention.

FIG. 1 is a circuit diagram illustrating a battery apparatus 200 according to the embodiment of the present invention.

The battery apparatus 200 according to the embodiment of the present invention is equipped with external terminals 201 and 202 between which a charger or a load is connected, two secondary batteries 203-1 and 203-2 connected in series between the external terminals 201 and 202, a discharging control switch 204 and a charging control switch 205 each comprised of an Nch transistor, and a charging/discharging control device 100. The charging/discharging control device 100 is equipped with charging/discharging control circuits 101-1 and 101-2 respectively connected to the secondary batteries 203-1 and 203-2.

The charging/discharging control circuit 101-1 is configured so as to be equipped with a battery voltage monitoring circuit 10-1, an output control circuit 11-1, a pull-up circuit 12-1, and a power-down circuit 13-1. Likewise, the charging/discharging control circuit 101-2 is configured so as to be equipped with a battery voltage monitoring circuit 10-2, an output control circuit 11-2, a pull-up circuit 12-2, and a power-down circuit 13-2. The charging/discharging control device 100 is further equipped with Nch transistors 110 and 111, a Pch transistor 112, a Zener diode 113, and a resistor 114.

The Pch transistor 112 and the Nch transistor 111 have gate electrodes respectively connected in common and are connected in series between a positive power supply connecting terminal 102-1 and a negative power supply connecting terminal 103-1 of the charging/discharging control circuit 101-1. The Nch transistor 110 has a gate electrode connected to a connection point of the Pch transistor 112 and the Nch transistor 111, a drain electrode connected to an input terminal 108-1 of the charging/discharging control circuit 101-1, and a source electrode connected to the negative power supply connecting terminal 103-1. The Zener diode 113 has a cathode connected to the gate electrode of the Nch transistor 111, and an anode a source electrode and a bulk of the Nch transistor 111. The resistor 114 has one end connected to the cathode of the Zener diode 113, and the other end connected to the external terminal 202 of the battery apparatus 200.

A description will next be made about the operations of the charging/discharging control circuits 101-1 and 101-2.

First, in the charging/discharging control circuit 101-1, the battery voltage monitoring circuit 10-1 monitors the voltage of the secondary battery 203-1 through the positive power supply connecting terminal 102-1 and the negative power supply connecting terminal 103-1 and outputs a detection signal DT-1 indicating that the secondary battery 203-1 is in an overdischarging state or an overcharging state to the output control circuit 11-1. When the detection signal DT-1 indicates the overdischarging of the secondary battery 203-1, the output control circuit 11-1 outputs a discharge control signal DC-1 to the discharging control switch 204 through the output terminal 104-1 to thereby turn OFF the discharging control switch 204. When the detection signal DT-1 indicates the overcharging of the secondary battery 203-1, the output control circuit 11-1 outputs a charge control signal CC-1 to the charging control switch 205 through the output terminal 105-1 to thereby turn OFF the charging control switch 205.

In the charging/discharging control circuit 101-2, the battery voltage monitoring circuit 10-2 monitors the voltage of the secondary battery 203-2 through the positive power supply connecting terminal 102-2 and the negative power supply connecting terminal 103-2 and outputs a detection signal DT-2 indicating that the secondary battery 203-2 is in an overdischarging state or an overcharging state to the output control circuit 11-2. When the detection signal DT-2 indicates the overdischarging of the secondary battery 203-2, the output control circuit 11-2 outputs a discharge control signal DC-2. The outputted discharge control signal DC-2 is inputted to the output control circuit 11-1 through the output terminal 104-2 and the input terminal 106-1 of the charging/discharging control circuit 101-1 and outputted to the discharging control switch 204 through the output terminal 104-1 as the discharge control signal DC-1. Thus, the discharging control switch 204 is turned OFF. When the detection signal DT-2 indicates the overcharging of the secondary battery 203-2, the output control circuit 11-2 outputs a charge control signal CC-2. The outputted charge control signal CC-2 is inputted to the output control circuit 11-1 through the output terminal 105-2 and an input terminal 107-1 of the charging/discharging control circuit 101-1 and outputted to the charging control switch 205 through the output terminal 105-1 as the charge control signal CC-1. Thus, the charging control switch 205 is turned OFF.

Further, when either (or both) of the secondary batteries 203-1 and 203-2 becomes overdischarged and the discharging control switch 204 is turned OFF, the voltage of the external terminal 202 is operated so as to be equal to that of the external terminal 201 by a load (not illustrated) connected between the external terminals 201 and 202. That is, the voltage of the external terminal 202 rises. When the voltage of the external terminal 202 rises, the Nch transistor 111 is turned ON, the Pch transistor 112 is turned OFF, and the Nch transistor 110 is turned OFF. Thus, an overdischarge signal ODC being a signal at the drain electrode of the Nch transistor 110 becomes a floating state (Hi-Z). This overdischarge signal ODC is inputted to the pull-up circuit 12-1 through the input terminal 108-1. The overdischarge signal ODC inputted thereto is pulled up to the positive power supply voltage of the secondary battery 203-1 in the pull-up circuit 12-1. A pull-up signal PU-1 pulled up to the positive power supply voltage is inputted to the power-down circuit 13-1. The power-down circuit 13-1 outputs a power-down signal PD-1 to the battery voltage monitoring circuit 10-1, based on the pull-up signal PU-1. At this time, the power-down circuit 13-1 outputs the power-down signal PD-1 even to the output control circuit 11-1. When the battery voltage monitoring circuit 10-1 receives the power-down signal PD-1 outputted from the power-down circuit 13-1, the battery voltage monitoring circuit 10-1 stops its own operation. Consequently, current consumption of the charging/discharging control circuit 101-1 is reduced.

On the other hand, when in the charging/discharging control circuit 101-2, either (or both) of the secondary batteries 203-1 and 203-2 becomes the overcharging state and the discharging control switch 204 is turned OFF, the power-down signal PD-1 generated by the above-described operation in the charging/discharging control circuit 101-1 is outputted from the output control circuit 11-1 through the output terminal 109-1. The outputted power-down signal PD-1 is inputted to an input terminal 108-2 of the charging/discharging control circuit 101-2. Incidentally, while the input terminal 108-2 is a terminal corresponding to the input terminal 108-1 of the charging/discharging control circuit 101-1, the input terminal 108-1 is inputted with the overdischarge signal ODC, whereas the input terminal 108-2 is inputted with the power-down signal PD-1.

Since the power-down signal PD-1 is of the signal pulled up to the positive power supply voltage of the secondary battery 203-1, it is equivalent to the negative power supply voltage of the secondary battery 203-2 in the charging/discharging control circuit 101-2. Therefore, the power-down signal PD-1 is pulled up to the positive power supply voltage of the secondary battery 203-2 in the pull-up circuit 12-2. A pull-up signal PU-2 pulled up to the positive power supply voltage is inputted to the power-down circuit 13-2. The power-down circuit 13-2 outputs a power-down signal PD-2 to the battery voltage monitoring circuit 10-2, based on the pull-up signal PU-2. When the battery voltage monitoring circuit 10-2 receives the power-down signal PD-2 outputted from the power-down circuit 13-2, the battery voltage monitoring circuit 10-2 stops its own operation. Consequently, current consumption of the charging/discharging control circuit 101-2 is reduced.

Thus, even in both of the cases where the secondary battery 203-1 becomes overdischarged, and the secondary battery 203-2 becomes overdischarged, it is possible to stop both operations of the charging/discharging control circuits 101-1 and 101-2 and suppress current consumption of the charging/discharging control device 100.

At this time, according to the present embodiment, while it is necessary to use several elements such as transistors for the generation of the power-down signal PD-1 for stopping the operation of the battery voltage monitoring circuit 10-1 of the charging/discharging control circuit 101-1, the power-down signal PD-1 generated in the charging/discharging control circuit 101-1 can be used for the generation of the power-down signal PD-2 for stopping the operation of the battery voltage monitoring circuit 10-2 of the charging/discharging control circuit 101-2. That is, it is not necessary for the generation of the power-down signal PD-2 to use the elements such as the transistors. Accordingly, it is possible to prevent an increase in the number of components as the charging/discharging control device 100 and the entire battery apparatus including the same.

Figure 2:
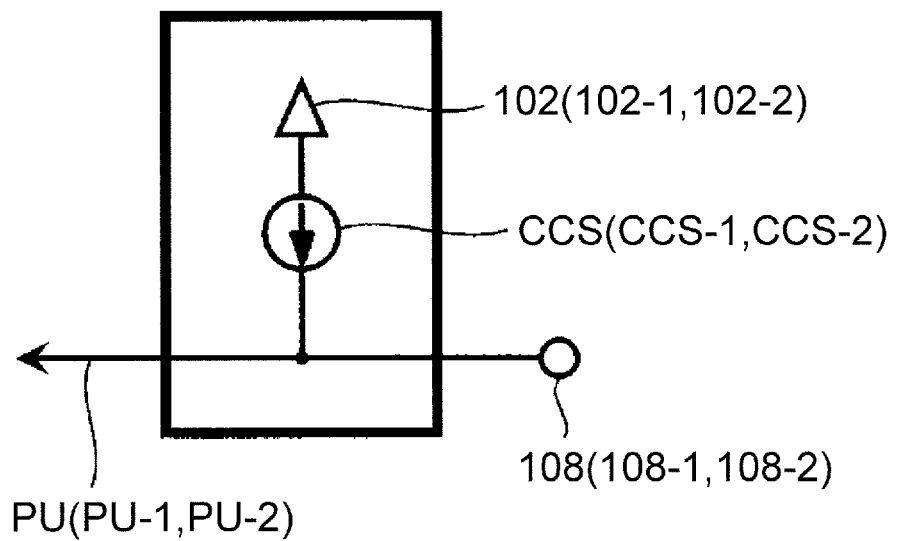
FIG. 2 is a circuit diagram illustrating one example of the configuration of a pull-up circuit in the embodiment of the present invention.
Figure 3:
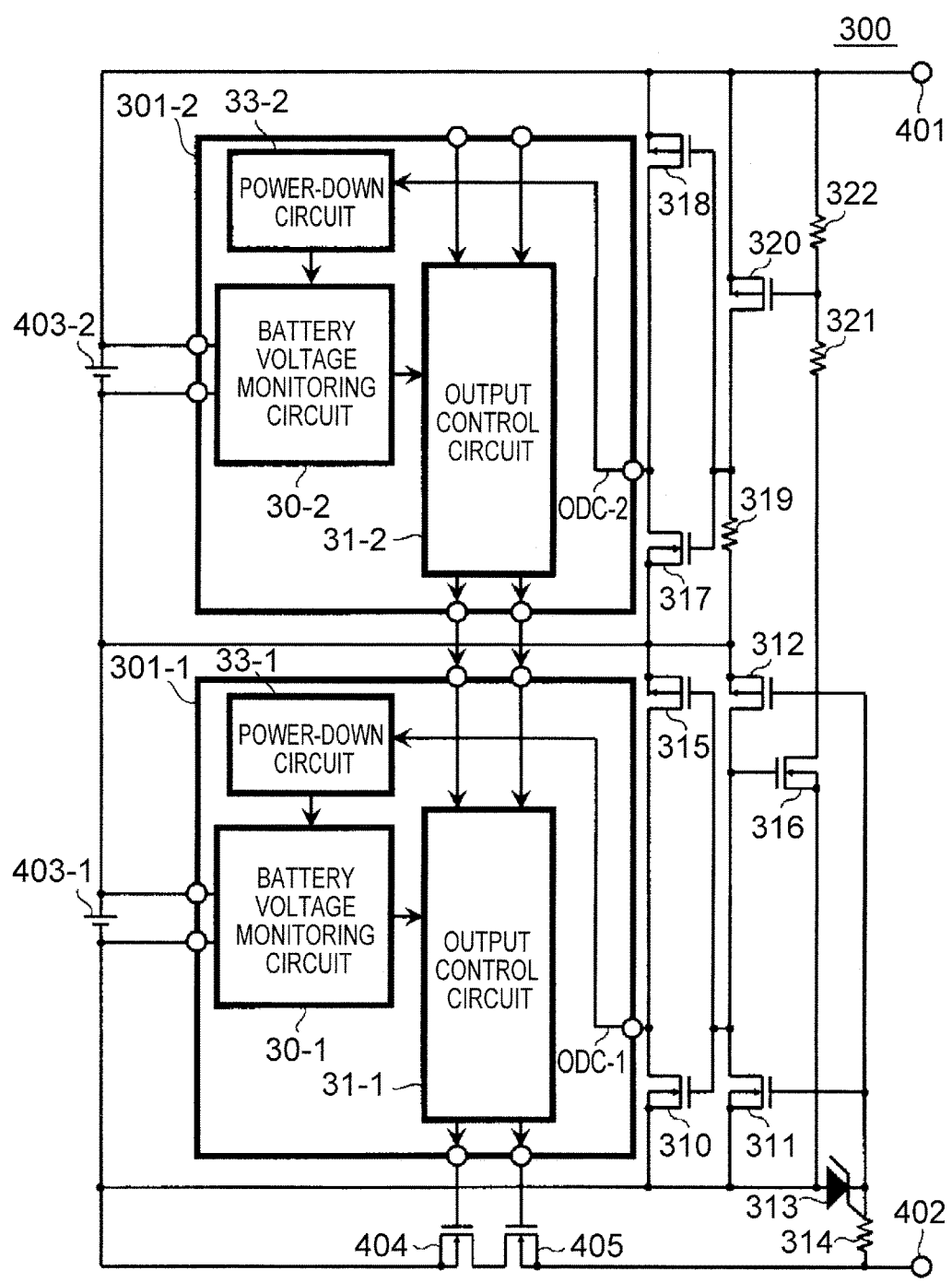
FIG. 3 is a circuit diagram illustrating a related art battery apparatus.

FIG. 2 is a circuit diagram illustrating one example of the configuration of the pull-up circuit 12 (12-1, 12-2) in the embodiment of the present invention.

The pull-up circuit 12 is equipped with a constant current source CCS (CCS-1, CCS-2) connected between the input terminal 108 (108-1, 108-2) and the positive power supply voltage of the secondary battery 203 (203-1, 203-2) of the charging/discharging control circuit 101 (101-1, 101-2) and outputs a signal obtained at a connection point of the constant current source CCS and the input terminal 108 as a pull-up signal PU (PU-1, PU-2).

With such a configuration, it is possible to pull up the overdischarge signal ODC inputted to the input terminal 108-1 to the positive power supply voltage of the charging/discharging control circuit 101-1, i.e., the positive power supply voltage of the secondary battery 203-1 and pull up the power-down signal PD-1 inputted to the input terminal 108-2 to the positive power supply voltage of the charging/discharging control circuit 101-2, i.e., the positive power supply voltage of the secondary battery 203-2.

According to the charging/discharging control device and the battery apparatus in the embodiment of the present invention as described above, in the charging/discharging control circuit 101-1, the power-down signal PD-1 is generated based on the overdischarge signal ODC generated based on the discharge control signal DC-1, whereas in the charging/discharging control circuit 101-2, the power-down signal PD-2 can be generated based on the power-down signal PD-1 generated in the charging/discharging control circuit 101-1. That is, it is not necessary to separately generate the overdischarge signal for generating the power-down signal PD-2. Thus, it is sufficient that the elements such as the transistors equivalent to the number required to generate only the overdischarge signal for generating the power-down signal PD-1 exist. It is thus possible to reduce the number of components and provide an inexpensive and simple circuit configuration.

Although the embodiment of the present invention has been described above, the present invention is not limited to the above-described embodiment. It is needless to say that various changes can be made thereto within the scope not departing from the gist of the present invention.

For example, although there is shown the battery apparatus equipped with the charging/discharging control device having the two-stage charging/discharging control circuits in the above-described embodiment, the charging/discharging control device according to the present invention may be equipped with charging/discharging control circuits of three stages or more according to the number of secondary batteries or the breakdown voltage of the charging/discharging control circuit for controlling each secondary battery. When the charging/discharging control circuits are configured as three stages by way of example, i.e., when the charging/discharging control device illustrated in FIG. 1 is further provided with a third charging/discharging control circuit (not illustrated, but called 101-3), the charging/discharging control device may be configured in the following manner. First, a third secondary battery (203-3) is inserted between the external terminal 201 and the secondary battery 203-2, and the third charging/discharging control circuit (101-3) is connected to the third secondary battery. Further, an output terminal 109-2 of the charging/discharging control circuit 101-2 is connected to an input terminal (108-3) of the third charging/discharging control circuit (101-3) to input the power-down signal PD-2 being the output of the output control circuit 11-2 to a pull-up circuit (12-3) of the third charging/discharging control circuit (101-3). Besides, a discharge control signal (DC-3) and a charge control signal (CC-3) outputted from an output control circuit (11-3) of the third charging/discharging control circuit (101-3) are respectively input to input terminals 106-2 and 107-2 of the charging/discharging control circuit 101-2.

According to such a configuration, while the several elements such as the transistors are required to generate the power-down signal PD-1 in the first-stage charging/discharging control circuit 101-1, the power-down signals PD-1 and PD-2 generated in the charging/discharging control circuits 101-1 and 101-2 can respectively be used for the generation of the power-down signal PD-2 for stopping the operation of the battery voltage monitoring circuit 10-2 of the second-stage charging/discharging control circuit 101-2 and a power-down signal (PD-3) for stopping the operation of a battery voltage monitoring circuit (10-3) of the three-stage charging/discharging control circuit (101-3). That is, the elements such as the transistors are not necessary not only for the generation of the power-down signal PD-2, but also for the generation of the power-down signal (PD-3) for stopping the operation of the battery voltage monitoring circuit (10-3). Thus, even when the charging/discharging control circuit is increased to a plurality of stages (four stages, five stages, etc.), it is possible to suppress an increase in the number of components to the minimum.

Further, although the power-down circuits 13-1 and 13-2 respectively output the power-down signals PD-1 and PD-2 to the output control circuits 11-1 and 11-2 and output them to the output terminals 109-1 and 109-2, they may directly be outputted from the power-down circuits 13-1 and 13-2 to the output terminals 109-1 and 109-2.

Furthermore, although the present embodiment has been described under the operation that the secondary battery is powered down when in the overdischarging state, a similar effect can be obtained even in the configuration of inputting the power-down signal from outside. That is, the overdischarge signal ODC in the present embodiment may be the OR of an overdischarge signal and an external power-down signal or may be only the external power-down signal. The overdischarge signal ODC is not limited to the charging/discharging control circuit in the present embodiment.

What is claimed is:

1. A charging/discharging control circuit comprising:
a battery voltage monitoring circuit that monitors a voltage of a secondary battery and outputs a detection signal indicative of the secondary battery being overdischarged or overcharged;
an output control circuit that receives the detection signal therein and outputs a discharge control signal for turning OFF a discharging control switch in response to the detection signal being indicative of the overdischarging, and outputs a charge control signal for turning OFF a charging control switch in response to the detection signal being indicative of the overcharging;
a pull-up circuit that receives a first power-down signal from an input terminal and outputs a pull-up signal obtained by pulling up the first power-down signal to a positive power supply voltage of the secondary battery; and
a power-down circuit that outputs a second power-down signal, based on the pull-up signal to the battery voltage monitoring circuit and to the output control circuit.

2. A charging/discharging control device that controls first and second secondary batteries, a discharging control switch, and a charging control switch connected in series between first and second external terminals, the charging/discharging control device comprising:
first and second charging/discharging control circuits respectively corresponding to the first and second secondary batteries;
wherein the first charging/discharging control circuit includes a first battery voltage monitoring circuit that monitors a voltage of the first secondary battery and outputs a first detection signal indicative of the first secondary battery being overdischarged or overcharged;
a first output control circuit that receives the first detection signal therein and outputs a first discharge control signal for turning OFF the discharging control switch in response to the first detection signal being indicative of the overdischarging, and outputs a first charge control signal for turning OFF the charging control switch in response to the first detection signal being indicative of the overcharging;
a first pull-up circuit that, in response to an overdischarge signal or an external power-down signal generated based on the first discharge control signal, outputs a first pull-up signal obtained by pulling up the overdischarge signal or the external power-down signal to a positive power supply voltage of the first charging/discharging control circuit; and
a first power-down circuit that outputs a first power-down signal to the first battery voltage monitoring circuit and to the first output control circuit for stopping the first battery voltage monitoring circuit, based on the first pull-up signal,
wherein the second charging/discharging control circuit includes:
a second battery voltage monitoring circuit that monitors a voltage of the second secondary battery and outputs a second detection signal indicative of the second secondary battery being overdischarged or overcharged,
a second output control circuit that receives the second detection signal therein and outputs a second discharge control signal for turning OFF the discharging control switch in response to the second detection signal being indicative of the overdischarging, and outputs a second charge control signal for turning OFF the charging control switch in response to the second detection signal being indicative of the overcharging,
a second pull-up circuit that includes a second constant current circuit and in response to the first power-down signal, outputs a second pull-up signal obtained by pulling up the first power-down signal to a positive power supply voltage of the second charging/discharging control circuit, and
a second power-down circuit that outputs a second power-down signal for stopping the second battery voltage monitoring circuit, based on the second pull-up signal.

3. The charging/discharging control device according to claim 2, wherein the first constant current source is connected between a first input terminal and a positive power supply terminal of the first charging/discharging control circuit and outputs as the first pull-up signal, a signal obtained at a connection point of the first input terminal and the first constant current source, and
wherein the second constant current source connected between a second input terminal and a positive power supply terminal of the second charging/discharging control circuit and outputs as the second pull-up signal, a signal obtained at a connection point of the second input terminal and the second constant current source.

4. A battery apparatus comprising:
first and second external terminals;
first and second secondary batteries, a discharging control switch, and a charging control switch connected in series between the first and second external terminals; and
a charging/discharging control device according to claim 2,
wherein the first and second secondary batteries, the discharging control switch, and the charging control switch are controlled by the charging/discharging control device.

5. The battery apparatus according to claim 4, wherein the charging/discharging control device further has a Pch transistor and first and second Nch transistors,
wherein the Pch transistor and the first Nch transistor have gate electrodes respectively commonly connected to the second external terminal and are connected in series between a positive power supply connecting terminal and a negative power supply connecting terminal of the first secondary battery,
wherein the second Nch transistor has a gate electrode connected to a connection point of the Pch transistor and the first Nch transistor, and a source electrode connected to the negative power supply connecting terminal of the first secondary battery, and
wherein the overdischarge signal is a signal generated in a drain electrode of the second Nch transistor.

6. A battery apparatus comprising:
first and second external terminals;
first and second secondary batteries, a discharging control switch, and a charging control switch connected in series between the first and second external terminals; and
a charging/discharging control device according to claim 3,
wherein the first and second secondary batteries, the discharging control switch, and the charging control switch are controlled by the charging/discharging control device.

7. The battery apparatus according to claim 6, wherein the charging/discharging control device further has a Pch transistor and first and second Nch transistors,
   wherein the Pch transistor and the first Nch transistor have gate electrodes respectively commonly connected to the second external terminal and are connected in series between a positive power supply connecting terminal and a negative power supply connecting terminal of the first secondary battery,
   wherein the second Nch transistor has a gate electrode connected to a connection point of the Pch transistor and the first Nch transistor, and a source electrode connected to the negative power supply connecting terminal of the first secondary battery, and
   wherein the overdischarge signal is a signal generated in a drain electrode of the second Nch transistor.

\* \* \* \* \*